June 20, 1944. H. S. EBERHARD 2,352,086
FINAL DRIVE HOUSING FOR COMBAT VEHICLES
Filed April 19, 1943   3 Sheets-Sheet 1
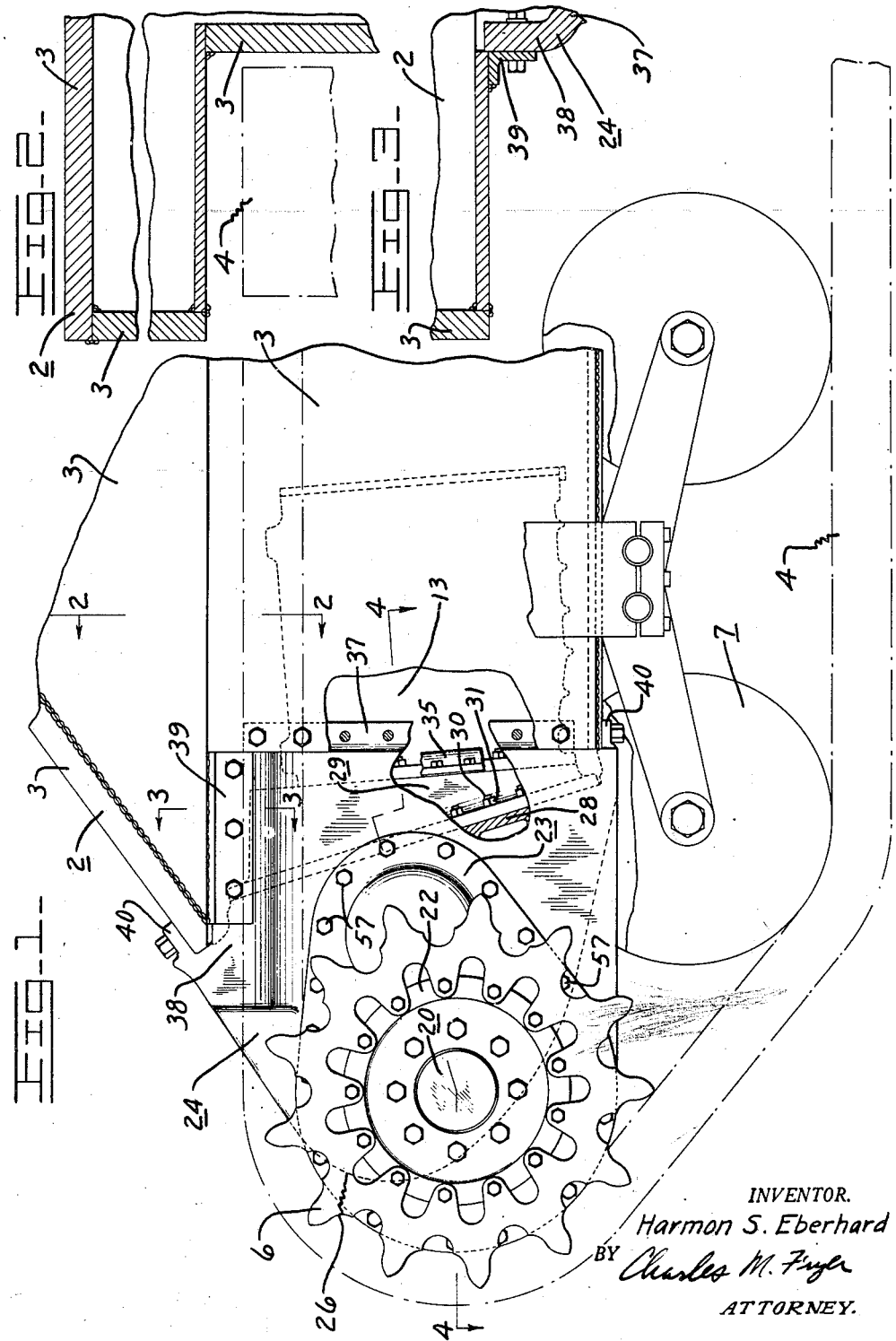
INVENTOR.
Harmon S. Eberhard
BY
ATTORNEY.

June 20, 1944. H. S. EBERHARD 2,352,086
FINAL DRIVE HOUSING FOR COMBAT VEHICLES
Filed April 19, 1943 3 Sheets-Sheet 2
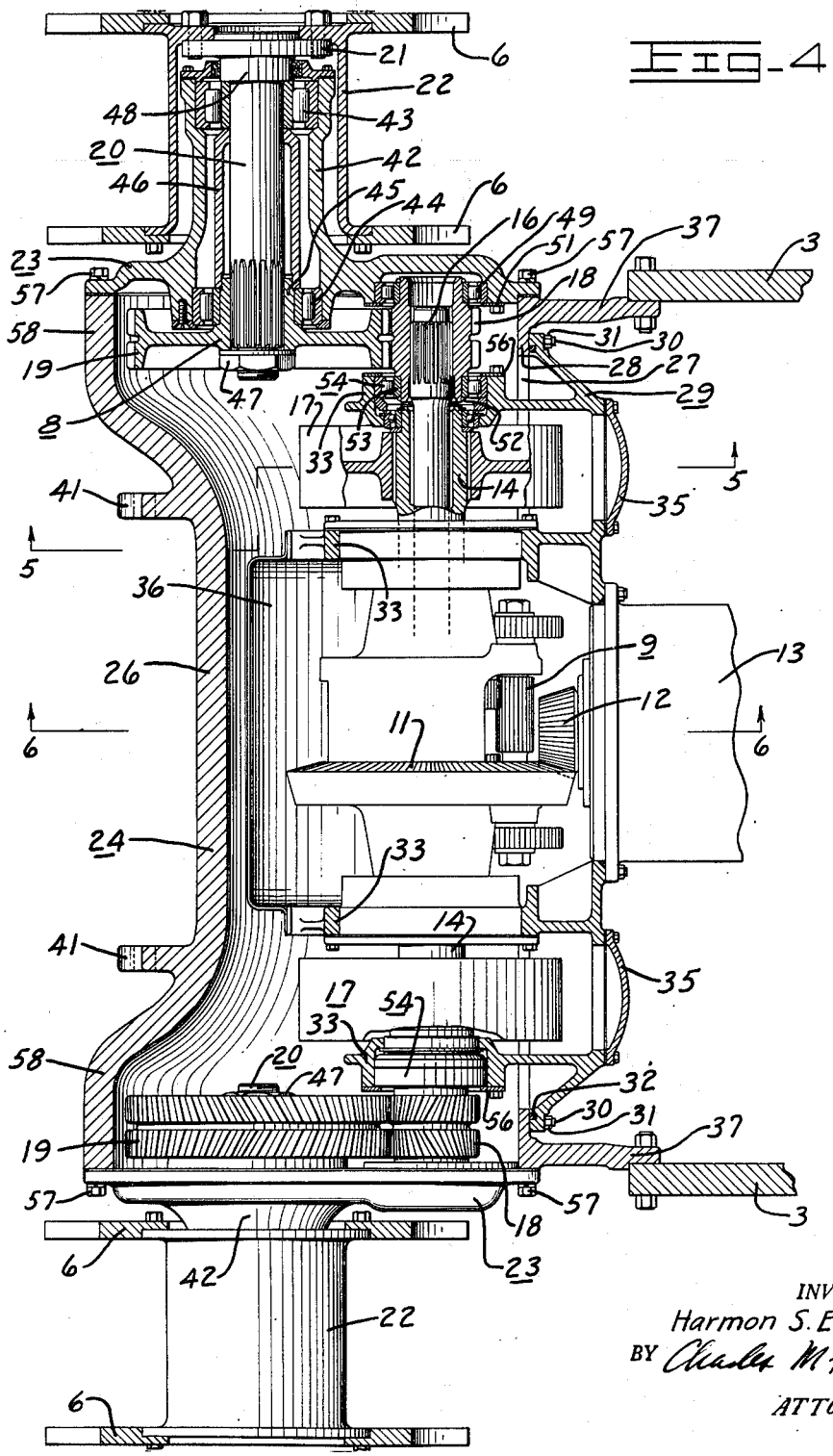
Fig-4-
INVENTOR.
Harmon S. Eberhard
BY
ATTORNEY.

June 20, 1944. H. S. EBERHARD 2,352,086
FINAL DRIVE HOUSING FOR COMBAT VEHICLES
Filed April 19, 1943 3 Sheets-Sheet 3
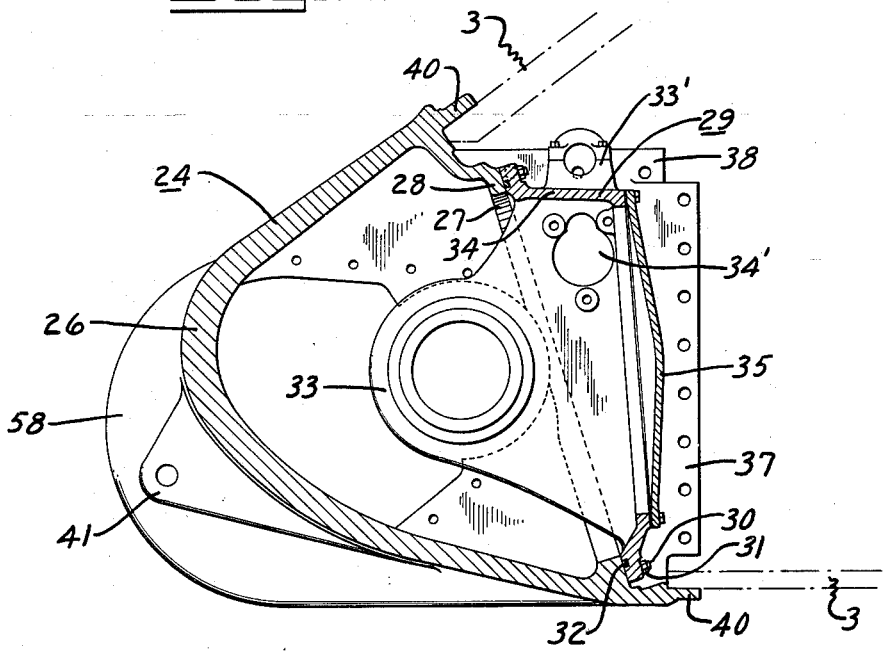
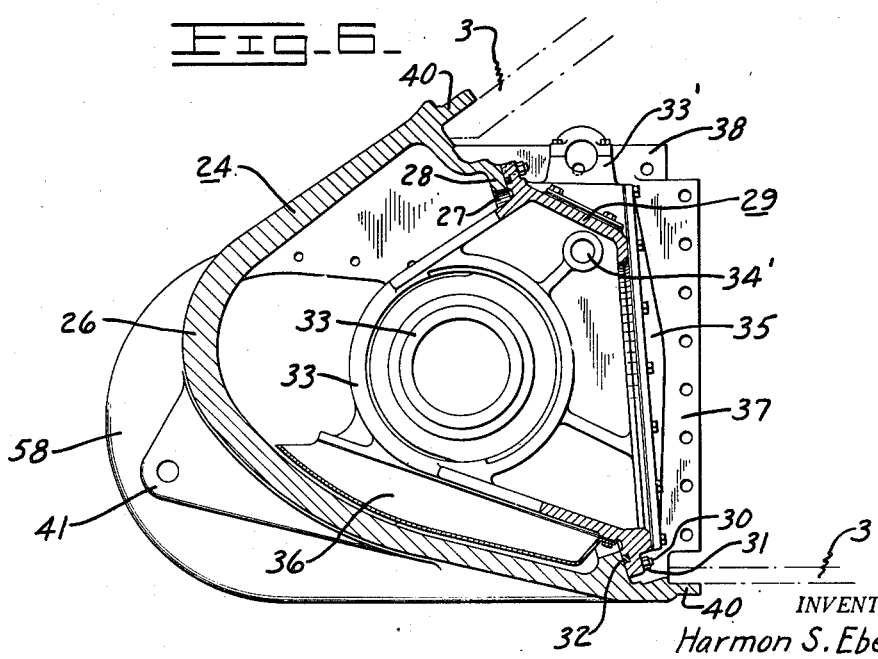
INVENTOR.
Harmon S. Eberhard
BY
ATTORNEY.

Patented June 20, 1944

2,352,086

UNITED STATES PATENT OFFICE 2,352,086

FINAL DRIVE HOUSING FOR COMBAT VEHICLES

Harmon S. Eberhard, Peoria, Ill., assignor to Caterpillar Tractor Co., San Leandro, Calif., a corporation of California Application April 19, 1943, Serial No. 483,640

8 Claims. (Cl. 180—9.1)

My invention relates to combat vehicles, and more particularly to a housing for final drive means in such vehicle.

In a common type of combat vehicle, known as the M-4 tank, final drive means for the vehicle is provided adjacent the front end thereof, at which exposed location it would be quite vulnerable to gunfire if not adequately protected. The protection for such final drive means in prior constructions, comprises a final drive casing formed of a plurality of separate castings having end flanges which are bolted together. Such construction is not as strong as a single casting, and is, consequently, vulnerable to gunfire; particularly should shells strike the flanges which may result in breakage thereof. Also, the flanges sometimes prevent shells from deflecting off the casing should they strike the casing a glancing blow in a direction transverse to that of the flanges. Furthermore, a final drive casing formed of a plurality of separate castings presents the problem of assembly, not only of the castings but of the final drive means therein.

My invention is designed to overcome these problems, and has as its objects, among others, the provision of improved final drive housing means in a combat vehicle of the type described; which includes a one piece or integral wall protecting the final drive means at the side where it is exposed to gunfire; in which such wall forms an integral part of a single casting forming a casing for the final drive means; which is of a construction facilitating assembly of final drive means in the casing and also disassembly therefrom; and which is of a relatively simple and economical construction. Other objects of my invention will become apparent from a perusal of the following description thereof.

Referring to the drawings:

Fig. 1 is a fragmentary, partially schematic, side elevational view of the front end portion of a combat vehicle embodying the construction of my invention; portions of the structure being shown broken away to illustrate the construction more clearly.

Fig. 2 is a fragmentary vertical transverse section of the hull of the vehicle, taken in a plane indicated by line 2—2 in Fig. 1; a portion of the structure being omitted from the view to shorten it.

Fig. 3 is a fragmentary transverse sectional view of a portion of the hull and the final drive housing means attached thereto, taken in a plane indicated by line 3—3 in Fig. 1.

Fig. 4 is a horizontal sectional view through the final drive housing means of my invention, taken in planes indicated by line 4—4 in Fig. 1; the final drive means within the housing means being shown more or less schematically in elevation, except for a portion which is shown in section.

Fig. 5 is a longitudinal sectional view taken in the planes indicated by line 5—5 in Fig. 4; the final drive means being omitted from the view.

Fig. 6 is a longitudinal sectional view taken in a plane indicated by line 6—6 in Fig. 4; the final drive means being omitted from the view.

As can be observed from Fig. 1, the tank or combat vehicle illustrated is of the conventional M-4 type comprising a hull 2, formed of a plurality of heavy armored plates 3 welded together, and which provides the main frame of the machine. The upper part of the hull extends over conventional ground engaging endless track mechanisms 4, one at each side of the machine, each of which is driven through a double driving sprocket 6 at the front of the machine; the hull being supported on the endless tracks by a plurality of bogie wheel mechanisms 7, only one of which is shown in Fig. 1.

Final drive sprockets 6 are driven through final drive means 8 which is of a conventional controllable, differential type construction now employed in such vehicle, which comprises a controllable spur gear differential mechanism 9 having master bevel gear 11 engaging driving bevel pinion 12 which is driven through suitable speed change transmission gearing (not shown) in a transmission casing 13. The controllable differential mechanism also includes a sleeve 14 at each side thereof, within each of which is mounted a driving shaft 16 that can be axially inserted and removed from the sleeve. Fixed to each sleeve 14 is a brake drum 17, controllable by a suitable brake band and control linkage (not shown); and splined to the outer end of each shaft 16 is a driving pinion 18 engaging a driving gear 19 splined on a shaft 20 having an outer flange 21 to which is secured a hub 22 having attached thereto sprocket rims forming the double driving sprocket 6.

Driving pinion 18 and the driving gear 19 at each side of the machine, form final drive reduction gearing, and are supported on an end cover plate or wall 23 which forms part of the final drive housing to be subsequently described.

As was previously related, the driving means 8 is of conventional construction in the type of vehicle in which it is embodied; and consequently it forms no part of my invention per se. Steering of the vehicle is effected in a well-known manner by breaking either one of braking mechanisms at 17 depending upon the direction to which it is desired to turn the vehicle.

The final drive housing means of my invention comprises a single armor steel casting 24 which has an arcuately shaped integral front wall 26 at the exposed outer side thereof for protecting the final drive means 8, and which extends transversely of the vehicle, the entire width of the final drive means, between endless track mechanisms 4; casting 24 providing a casing for final drive means 8. At the side opposite wall 26, or in other words the unexposed inner side thereof, casing 24 is formed with an opening 27 bounded by a flanged portion 28 over which is detachably secured a cast steel wall or cover structure 29 which supports the differential mechanism of final drive means 8. Studs 30 mounted in flange portion 28, and nuts 31 screwed on the studs, provide the means of attachment between casing 24 and wall structure 29; a gasket 32 of suitable material, such as rubber, being in a recess in wall structure 29 to provide a seal for precluding leakage of lubricant from casing 24.

Wall structure 29 is formed with a plurality of bearing brackets or cages 33 integral therewith, which support the described final drive differential mechanism in suitable bearings. Thus, the differential mechanism may be assembled beforehand on wall structure 29, and the entire wall structure mounted on casing 24, which facilitates assembly and servicing of the differential mechanism. Wall structure 29 is also provided with integral bearing brackets 33' on an upper portion 34 thereof for the mounting of control mechanism (not shown) for the brakes at 17; suitable bearing apertures 34' being formed in brackets 33 for such control mechanism.

Cover plates 35 are detachably mounted on wall structure 29 opposite the brakes at 17, so as to render ready access thereto, when adjustment or servicing thereof is required; and an oil reservoir pan 36 is secured to brackets 33 of wall structure 29. To the outer side of wall structure 29, is detachably secured the transmission casing 13 which contains the previously mentioned speed change transmission gearing.

Each end of casing 24 is open for insertion of the final drive gearing 18 and 19 therethrough but the rear portions of such ends are formed with wing extensions or flanges 37, integral with casing 24 and which extend past supporting wall structure 29 to protect the same. Also, wings 37 provide means for detachably connecting casing 24 to side plates of hull 2; the wings being provided with upper offset portions 38 for detachable connection to angles 39 secured to the hull. In addition, casing 24 is formed with transverse rear flanges 40 along its upper and lower rear edges, which provide means for detachable connection of the casing to upper and lower plates of hull 2. It may be necessary to tow the vehicle; and for this purpose wall 26 of casting 24 is formed with integral apertural lugs 41 for attachment of tow lines thereto.

The support for the final drive gearing on each cover plate or wall 23 which is also of cast armor steel, includes an outwardly extending sleeve or hub 42 integral with such cover, and which has a bearing 43 in its outer end and a bearing 44 in its inner end; the hub 45 of gear 19 being journalled in inner bearing 44 and the outer end of shaft 20 being journalled in outer bearing 43. A spacer sleeve 46 is interposed between bearings 43 and 44 about shaft 20; the assembly including gear 19 being held in position by means of nut 47 screwed on shaft 20 adjacent its inner end, which engages hub 45 of gear 19 and thrusts such assembly against shoulder 48 formed adjacent the outer end of shaft 20.

Driving pinion 18 is splined on shaft 16 which, as was previously related, is axially insertable into and removable from sleeve 14. Therefore, in assembling the final drive gears after the final drive differential mechanism is assembled by attachment of wall structure 29, shaft 16 is first inserted in sleeve 14. Then if pinion 18 and gear 19 are of the spur teeth type, pinion 18 may be slipped over shaft 16, and gear 19 will become meshed therewith upon attachment of cover 23 to casing 24. However, pinion 18 and gear 19 are of the herringbone teeth type in the final drive means of the vehicle described. Consequently, they cannot be meshed or separated by mere relative axial movement.

Advantage is taken of this to enable pinion 18 to be meshed with gear 19 beforehand on cover 23, thus enabling pinion 18 after it is mounted in cover 23 together with gear 19, to be slipped over the splined portion of shaft 16 upon attachment of cover 23 to casing 24. In this connection, it is to be noted that the outer end of the hub of pinion 18 is journalled in a bearing 49 held in cover 23 by retainer 51. The inner end of the hub of pinion 18 has secured thereto, by snap ring 52, the inner race 53 of a roller bearing 54, the outer race and rollers of which are held in an outer bearing bracket 33 by retainer 56. Consequently, such inner race 53 may be readily connected to or separated from bearing 54, permitting the described mode of assembly of pinion 18. Cover plates 23 are detachably connected to casing 24 by cap screws 57; and the front end portions of the casing are provided with suitable pocket extensions 58 to accommodate gears 19.

From the preceding, it is seen that casing 24 is detachably connected to hull 2 of the vehicle, and that wall structure 29 is detachably connected as a unit with the final drive differential mechanism supported thereon, over rear opening 27 in casing 24. After connection of shafts 16 through sleeves 14, the final drive gearing 18 and 19 may be readily connected to the final drive differential mechanism upon attachment of end covers 23 to casing 24. Disassembly may be readily accomplished in a reverse manner. The one piece character of casing 24 not only provides armor protection for the final drive means therein, which is of great strength, but provides the one piece or integral front wall 26 which has no flanged connections that might break if struck by shells.

I claim:

1. A combat vehicle having final drive means adjacent an end thereof where it would be exposed to gunfire if unprotected; and a housing for the final drive means including a one piece casting providing a casing protecting the final drive means against gunfire, the casting extending transversely of the vehicle and having an integral wall at the exposed outer side thereof and an opening at the unexposed inner side thereof, and a final drive mechanism supporting structure detachably secured to said casting over said opening.

2. A combat vehicle having final drive means adjacent an end thereof where it would be exposed to gunfire if unprotected; and a housing for the final drive means including a one piece casting providing a casing protecting the final drive means against gunfire, the casting extending transversely of the vehicle and having an integral wall at the exposed outer side thereof and an opening at the unexposed inner side thereof, and a final drive mechanism supporting wall structure detachably secured to said casting over said opening; the supporting wall structure having secured thereto bearing brackets for the final drive mechanism to support such mechanism within the casting and to enable such mechanism to be assembled in or disassembled from the casting as a unit therewith.

3. A combat vehicle having final drive means; a housing for the final drive means including a casing extending transversely of the vehicle and having a wall at the exposed outer side thereof and an opening at the unexposed inner side thereof, and a final drive mechanism supporting wall structure detachably secured to said casing over said opening; the supporting wall structure having integrally secured thereto at its inner side bearing brackets for the final drive mechanism to support such mechanism within the casing and to enable such mechanism to be assembled in or disassembled from the casing as a unit therewith; and a speed change transmission casing detachably secured to the supporting wall structure at the outer side thereof.

4. A combat tank having an armored hull, ground engaging driving means at each side of the hull, a single casting secured to the hull at the front end thereof between said ground engaging means providing a protective casing for final drive means therein, the casting extending transversely of the hull and having an integral wall at the exposed outer side thereof and an opening at the unexposed inner side thereof, and a final drive mechanism supporting structure detachably secured to said casting over said opening.

5. A combat vehicle having a single casting extending transversely of the vehicle adjacent an end thereof providing a protective casing for final drive means therein; the casting having an integral wall at the exposed outer side thereof, an opening at the unexposed inner side thereof, and an opening at each of its opposite ends; a final drive mechanism supporting structure detachably secured to said casting over said inner side opening; and a final drive gearing supporting structure detachably secured to said casting over each end opening.

6. A combat vehicle having a single casting extending transversely of the vehicle adjacent an end thereof providing a protective casing for final drive means therein; the casting having an integral wall at the exposed outer side thereof and which is arcuately shaped in cross section, an opening at the unexposed inner side thereof, and an opening at each of its opposite ends; a final drive mechanism supporting structure detachably secured to said casting over said inner side opening; a final drive gearing supporting structure detachably secured to said casting over each end opening; and a speed change transmission casing detachably secured to the inner side of the final drive mechanism supporting structure.

7. A housing for final drive means in a combat vehicle comprising a single casting having an integral wall exposable to gunfire and which is arcuately shaped in cross section, end walls, an opening in each end wall, and an opening opposite the integral wall, each end wall having a wing extending past the last mentioned opening.

8. A housing for final drive means in a combat vehicle comprising a single casting having an integral wall exposable to gunfire and which is arcuately shaped in cross section, end walls, an opening in each end wall, and an opening opposite the integral wall, each end wall having a wing extending past the last mentioned opening; and a final drive mechanism supporting structure detachably secured over the last mentioned opening between such wings.

HARMON S. EBERHARD.